Patented June 19, 1934

1,963,072

UNITED STATES PATENT OFFICE 1,963,072

METHOD OF TREATING DEEP WELLS

Ray H. Boundy and James E. Pierce, Midland, Mich., assignors to The Dow Chemical Company, Midland, Mich., a corporation of Michigan No Drawing. Application May 8, 1933, Serial No. 669,933

6 Claims. (Cl. 166—21)

The invention relates to an improved method of treating oil or gas wells, especially wells situated in limestone formations. One of the objects of the invention is to increase the rate of flow of oil or gas from the producing stratum into the well cavity. Another object is to counteract some preventable natural causes for the decline of yield of oil or gas. Other objects and advantages will appear as the description proceeds.

A familiar example of the decline of yield from such wells is that occasioned by the deposition of paraffin in the producing rock, the walls of the well cavity, and in channels leading thereto, which impedes the flow of oil or gas into the cavity. Methods have been proposed for removing such deposits, which depend upon the use of heat generated by the interaction of chemicals introduced into the well to melt the paraffin. Such methods, however, have not been adopted generally owing to various disadvantages, particularly as regards the relatively ineffective quantity of heat liberated, the destructive action of the chemicals upon the metallic parts of the well, such as the casing and tube, as well as the formation of reaction products in the cavity which tend to plug the pores and channels of the rock.

We have found a method for the chemical generation of heat to remove paraffin and the like in a well by which the result may be more effectively accomplished than heretofore, with reduced risk of damage to metallic parts in the well and without depositing clogging reaction products in the pores of the rock. At the same time we are enabled to enlarge and extend the oil drainage channels leading to the well cavity by chemical attack upon the limestone formation in which such passages are located.

We have discovered that these and other improvements may be obtained in the treatment of wells by bringing anhydrous aluminum chloride into contact with water in the well cavity. In the anhydrous or substantially anhydrous condition aluminum chloride generates a large quantity of heat when brought into contact with, and dissolved in, water and at the same time by hydrolysis produces hydrochloric acid. However, all the acid that is capable of being produced is not formed at once, but instead there is a gradual production of acid, the concentration of which calculated from pH measurements on solutions containing from 1 to 40 grams of aluminum chloride per liter does not exceed about 0.012 gram per liter. Although the acid is present in the hydrolyzing solution in relatively low concentration and, therefore, does not cause damage to metallic parts of the well, the concentration is high enough to effectively dissolve limestone. The quantity of limestone dissolved is substantially equivalent to the amount of aluminum chloride employed since, as the limestone neutralizes the acid, the hydrolysis continues to produce more until all the aluminum chloride is hydrolyzed. Thus the heat generated may be used to melt the deposited paraffin while the acid simultaneously formed attacks the rock formation. The invention, then, consists in the method hereinafter more fully described and pointed out in the claims.

Anhydrous aluminum chloride in dry, powdered, or granular form falls freely down a well tubing or casing and, therefore, may be readily introduced into the well cavity in any convenient manner. In carrying our invention into effect we may first bail or pump out the oil from the well cavity and then introduce therein the aluminum chloride, followed by a sufficient quantity of water to dissolve the same. If desired, oil may be employed to assist the flow of aluminum chloride powder into the well. In wells in which water normally collects in the cavity it is usually unnecessary first to bail or pump out the same, since such water may be used to dissolve the aluminum chloride. The water immediately acts upon and dissolves the aluminum chloride which thereby generates heat and hydrochloric acid. The acid so formed attacks the limestone formation producing carbon dioxide and a solution of calcium chloride. The carbon dioxide serves to agitate the mixture of aluminum chloride and water, thus promoting solution both of the aluminum chloride and also of the limestone. At the same time the heat produced melts the paraffin deposits. After the chemical reactions are substantially completed, the spent liquors are removed from the well by bailing or pumping.

While it is preferable to introduce into the well the aluminum chloride in a dry condition, we do not wish to limit ourselves to such procedure, inasmuch as the hot solution, obtained on dissolving aluminum chloride in water outside the well, may be poured into the well and there effectively act to dissolve limestone and melt paraffin. Such procedure has advantages over the conventional use of aqueous acid solutions, which are difficult to transport to a well site owing to their bulk as well as to their corrosive character. On the other hand, dry aluminum chloride, being substantially non-corrosive, may be brought to a well site in inexpensive sheet metal containers. Furthermore, the weight of aluminum chloride required to make an acid solution for dissolving limestone is less than half the weight of commercial aqueous hydrochloric acid having an equal dissolving capacity. Thus we avoid the difficulties of transporting corrosive mineral acids, reduce the cost of treatment, and substantially avoid corrosion of the metal parts of the well and transporting equipment.

Although the melted paraffin remains fluid in the well for a considerable time after the introduction of aluminum chloride it may be desirable, in some instances, to introduce a liquid having a solvent action on paraffin, such as carbon tetrachloride or a petroleum distillate, so as to dissolve the melted paraffin and maintain it in liquid form. The paraffin is thereby prevented from returning to the solid state and may be removed from the well at any convenient time, along with the spent solution.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. In a method of treating a well, the step which consists in introducing aluminum chloride into the well.

2. In a method of treating a well, the step which consists in introducing anhydrous aluminum chloride into the well.

3. In a method of treating a well located in a limestone formation, the steps which consist in introducing anhydrous aluminum chloride into such well and a sufficient quantity of water to dissolve the aluminum chloride.

4. In a method of treating a well located in a limestone formation, the steps which consist in introducing anhydrous aluminum chloride into such well, a sufficient quantity of water to dissolve the aluminum chloride, and then removing the spent liquors from the well.

5. In a method of treating a well located in a limestone formation, the steps which consist in forming a hot aqueous solution of aluminum chloride and introducing the same into such well.

6. In a method of treating a well located in a limestone formation, the steps which consist in forming a hot aqueous solution of aluminum chloride, introducing the same into such well, and then removing the spent liquors from the well.

RAY H. BOUNDY.
JAMES E. PIERCE.